United States Patent
Maj et al.

(10) Patent No.: US 8,161,118 B2
(45) Date of Patent: Apr. 17, 2012

(54) ACTIVE POLLING TECHNIQUE

(75) Inventors: Artur Maj, Skarzysko Kamienna (PL); Rajmund Paczkowski, Marki (PL)

(73) Assignee: Oracle International Corporation, Redwood Shores, CA (US)

( * ) Notice: Subject to any disclaimer, the term of this patent is extended or adjusted under 35 U.S.C. 154(b) by 498 days.

(21) Appl. No.: 11/577,495

(22) PCT Filed: May 26, 2006

(86) PCT No.: PCT/US2006/020576
§ 371 (c)(1),
(2), (4) Date: Apr. 18, 2007

(87) PCT Pub. No.: WO2007/139538
PCT Pub. Date: Dec. 6, 2007

(65) Prior Publication Data
US 2009/0144370 A1    Jun. 4, 2009

(51) Int. Cl.
*G06F 15/16* (2006.01)
(52) U.S. Cl. .................................................... 709/206
(58) Field of Classification Search ........... 709/204–206
See application file for complete search history.

(56) References Cited

U.S. PATENT DOCUMENTS

| | | | |
|---|---|---|---|
| 6,175,859 B1 * | 1/2001 | Mohler | 709/206 |
| 6,732,103 B1 * | 5/2004 | Strick et al. | 707/10 |
| 2005/0080852 A1 | 4/2005 | Kelley et al. | |
| 2005/0138129 A1 * | 6/2005 | Adamczyk et al. | 709/206 |
| 2006/0218232 A1 | 9/2006 | Kubala et al. | |
| 2008/0126476 A1 * | 5/2008 | Nicholas et al. | 709/203 |

OTHER PUBLICATIONS

Artur Maj, contributed by Rajmund Paczkowski, *Active Polling*, Oracle EMEA Mobile and Wireless Center of Expertise, Dec. 2005, 12 pages.

* cited by examiner

*Primary Examiner* — Yemane Mesfin
(74) *Attorney, Agent, or Firm* — Kilpatrick Townsend & Stockton LLP

(57) ABSTRACT

Methods, systems, and machine-readable media are disclosed for soliciting and facilitating a response to an electronic communication. According to one embodiment, a method of soliciting and facilitating a response to an electronic communication can comprise receiving from an originator a request for the electronic communication with one or more recipients. Based on the request, a determination can be made as to whether to solicit a response from the one or more recipients. In response to determining to solicit a response from the one or more recipients, one or more possible responses to the electronic communication can be determined, at least one message that includes the one or more possible responses can be generated, and the at least one message can be sent to the one or more recipients to initiate the communication.

27 Claims, 6 Drawing Sheets

ACTIVE POLLING TECHNIQUE

BACKGROUND OF THE INVENTION

Embodiments of the present invention relate generally to electronic communications and more particularly to soliciting and facilitating a response to an electronic communication.

Electronic communications such as emails, Instant Messages (IMs), Interactive Voice Response (IVR) messages, Short Message Service (SMS) messages, Multimedia Message Service (MMS) messages, etc. can be sent and received in a variety of one-to-one, one-to-many, or other fashions. To generalize the most common uses of various electronic communication channels such as email, senders can use emails or other electronic communications to compose and send messages to one or more other users that may or may not require replies. Each receiver receives and reads the message and can reply to the message with an answer that may or may not require further reply. So, for example, the sender can send a message that requests some information or feedback from a number of users, which may be the base for further decisions the sender needs to make. In this case, the sender composes and sends an email or other message to a group of recipients and waits until they respond. After receiving responses, it is the sender who is responsible for collecting all the answers and processing them.

These types of communications can be highly inefficient since the sender manually collects the responses, reads the individual responses and prepares the final statistics (e.g., 3 people said yes, 1 person said no, also received some comments). Sometimes this process is done formally, e.g., when the sender needs to create a formal report based on received input, or informally, e.g., when the sender just needs to know others' opinions. In any case, it is still the sender who needs to remember how many replies are expected, remind users to answer the emails, and spend a certain amount of time on tallying or otherwise compiling the final statistics. The recipients also need to spend some time to compose and type a reply to the sender.

Some methods of addressing these inefficiencies have been presented. These methods are web based approaches to send and manage various one-to-many communications such as polling, sending invitations, etc. To use these methods a user logs onto a website offered by a service for handling such communications. Through this service, the user can initiate communications to any number of recipients. Email messages to these recipients are sent by the service. The email messages include a link back to the service's website which provides, via one or more web pages, a number of options for responding to the original messages. The recipient responses can be accumulated by the service and presented to the original user via the other pages of the website.

However, such a system is not without some problems. First of all, the websites offered by such services typically require a user to subscribe to the service and are not available to those who are not or do not want to be subscribers. Second, being web-based, such services are not accessible or conveniently accessible to all devices. For example, a mobile device such as a cell phone may be able to receive various forms of messages such as emails but may not be able to view web pages. In other cases, viewing a web page through such a device may be inconvenient or burdensome due to the size of the screen of display on the device or other limitations of the device. Furthermore, since these methods rely on redirecting a recipient from the original email message to a website, they are inherently inefficient since a recipient cannot easily and quickly answer or reply to the message through the original message or channel.

Hence, there is a need for improved methods and systems that allow for soliciting and facilitating a response to an electronic communication.

BRIEF SUMMARY OF THE INVENTION

Methods, systems, and machine-readable media are disclosed for soliciting and facilitating a response to an electronic communication. According to one embodiment, a method of soliciting and facilitating a response to an electronic communication can comprise receiving from an originator a request for the electronic communication with one or more recipients. Based on the request, a determination can be made as to whether to solicit a response from the one or more recipients. Determining whether to solicit a response from the one or more recipients can be based on one or more keywords in the request for the electronic communication. Alternatively or additionally, determining whether to solicit a response from the one or more recipients can be based on a selection from the originator of the request for the electronic communication.

In response to determining to solicit a response from the one or more recipients, one or more possible responses to the electronic communication can be determined. Determining one or more possible responses can be based on one or more selections from the originator of the request for the electronic communication. For example, the selections from the originator of the request for the electronic communication can be received in response to a plurality of predetermined possible responses presented to the originator. At least one message that includes the one or more possible responses can be generated, and the at least one message can be sent to the one or more recipients to initiate the communication.

According to one embodiment, the method can further comprise maintaining a record of messages sent and the one or more recipients to which the messages have been sent. A response can be received from one or more of the recipients, the response indicating a selection of at least one of the one or more possible responses. Based on the record of messages to the one or more recipients and responses from the one or more recipients a determination can be made as to which of the one or more recipients have not responded. A reminder can be sent to recipients from which no response has been received.

Statistics of responses received from the one or more recipients can be accumulated. An answer message can be generated that indicates the statistics of responses received from the one or more recipients. The answer message can then be sent to the originator of the request for the electronic communication.

According to one embodiment, prior to generating the at least one message that includes the one or more possible responses, a presence of each recipient can be determined. In such a case, generating the at least one message that includes one or more possible responses can comprise generating a plurality of messages. Each of the plurality of messages can be of a type readable by at least one recipient based on the presence of each recipient. Additionally or alternatively, sending the message to the one or more possible recipients can comprise sending the message based on the presence of each recipient.

According to another embodiment, a system for soliciting and facilitating a response to an electronic communication can comprise an originating device, one or more recipient devices, and a server communicatively coupled with each of the originating devices and one or more recipient devices. The server can include an agent, such as, for example, a Mail Transfer Agent (MTA), adapted to receive from the originating device a request for the electronic communication with at least one of the one or more recipient devices and determine based on the request whether to solicit a response from the at least one recipient device. In response to determining to solicit a response from the at least one recipient device, the agent can determine one or more possible responses to the electronic communication, generate at least one message that includes the one or more possible responses, and send the at least one message to the at least one recipient device to initiate the communication.

The agent can be further adapted to maintain a record of messages sent and the recipient devices to which the messages have been sent. The agent can also be adapted to receive a response from one or more of the recipient devices, the response indicating a selection of at least one of the one or more possible responses. The agent can determine, based on the record of messages to the one or more recipient devices and responses from the one or more recipient devices, which of the one or more recipient devices have not responded and send a reminder to recipient devices from which no response has been received.

The agent can also be adapted to accumulate statistics of responses received from the one or more recipient devices and generate an answer message that indicates the statistics of responses received from the one or more recipient devices. The agent can send the answer message to the originating device.

According to one embodiment, the agent can be further adapted to determine a presence of each recipient prior to generating the at least one message that includes the one or more possible responses. In such a case, the agent can generate a plurality of messages that includes one or more possible responses, each of the plurality of messages of a type readable by at least one recipient based on the presence of each recipient. Additionally or alternatively, the agent can send the message to the one or more possible recipients based on the presence of each recipient.

According to yet another embodiment, a system for soliciting and facilitating a response to an electronic communication can comprise one or more recipient devices; and an originating device communicatively coupled with each of the one or more recipient devices. The originating device can include an agent, such as, for example, a Mail User Agent (MUA), adapted to receive a request for the electronic communication with at least one of the one or more recipient devices, determine based on the request whether to solicit a response from the at least one recipient device, and in response to determining to solicit a response from the at least one recipient device, determine one or more possible responses to the electronic communication, generate at least one message that includes the one or more possible responses, and send the at least one message to the at least one recipient device to initiate the communication.

The agent can be further adapted to maintain a record of messages sent and the recipient devices to which the messages have been sent. The agent can receive a response from one or more of the recipient devices, the response indicating a selection of at least one of the one or more possible responses. Based on the record of messages to the one or more recipient devices and responses from the one or more recipient devices, the agent can determine which of the one or more recipient devices have not responded and send a reminder to recipient devices from which no response has been received.

Additionally or alternatively, the agent can accumulate statistics of responses received from the one or more recipient devices.

According to one embodiment, the agent can be further adapted to determine a presence of each recipient prior to generating the at least one message that includes the one or more possible responses. In such a case, the agent can generate a plurality of messages that includes one or more possible responses, each of the plurality of messages of a type readable by at least one recipient based on the presence of each recipient. Additionally or alternatively, the agent can send the message to the one or more possible recipients based on the presence of each recipient.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for soliciting and facilitating a response to an electronic communication. It should be noted that, while discussed herein with reference to email messages, embodiments of the present invention are thought to be useful with other types of electronic communications. For example, embodiments of the present invention are thought to be equally applicable to Instant Messages (IMs), Interactive Voice Response (IVR) messages, Short Message Service (SMS) messages, Multimedia Message Service (MMS) messages, etc. Other types of one-to-one, one-to-many, or other electronic communications are also contemplated and considered to be within the scope of the present invention.

Embodiments of the present invention allow an originator to generate and send a message to one or more recipients that can include options for responding to the message. So, for example, an email to one or more recipients can include options for responding to a question in the email. The recipients can then read and respond to the message in via the same medium as the original message without being redirected to another medium.

Generally speaking, soliciting and facilitating a response to an electronic communication can comprise receiving from an originator a request for the electronic communication with one or more recipients. Based on the request, a determination can be made as to whether to solicit a response from the one or more recipients. In response to determining to solicit a response from the one or more recipients, one or more possible responses to the electronic communication can be determined, at least one message that includes the one or more possible responses can be generated, and the at least one message can be sent to the one or more recipients to initiate the communication. Additional details of the various embodiments of the present invention will be discussed below.

Figure 1:
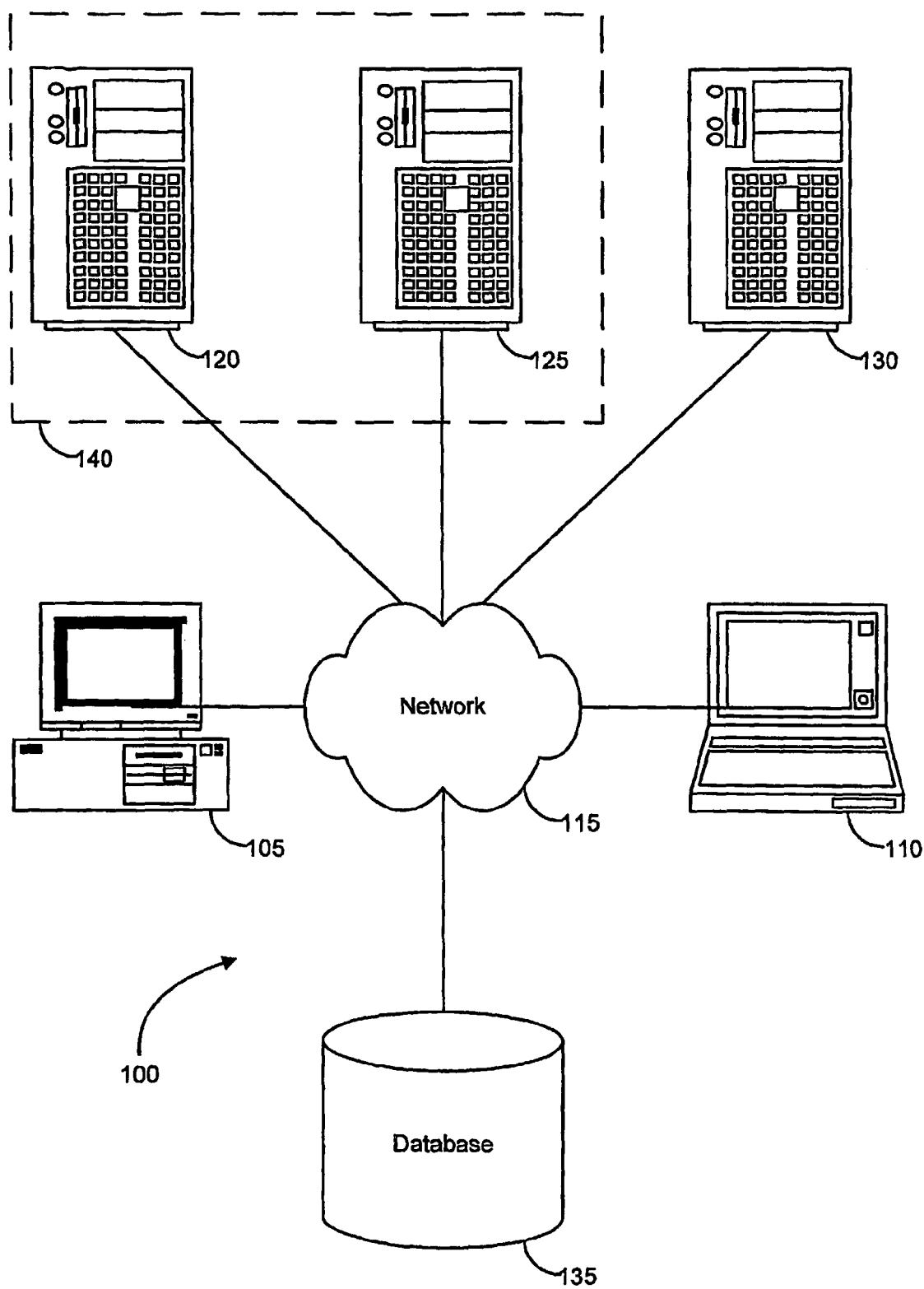
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g. a network operating under any of the IEEE 802.11 suite of protocols, the Bluetooth protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
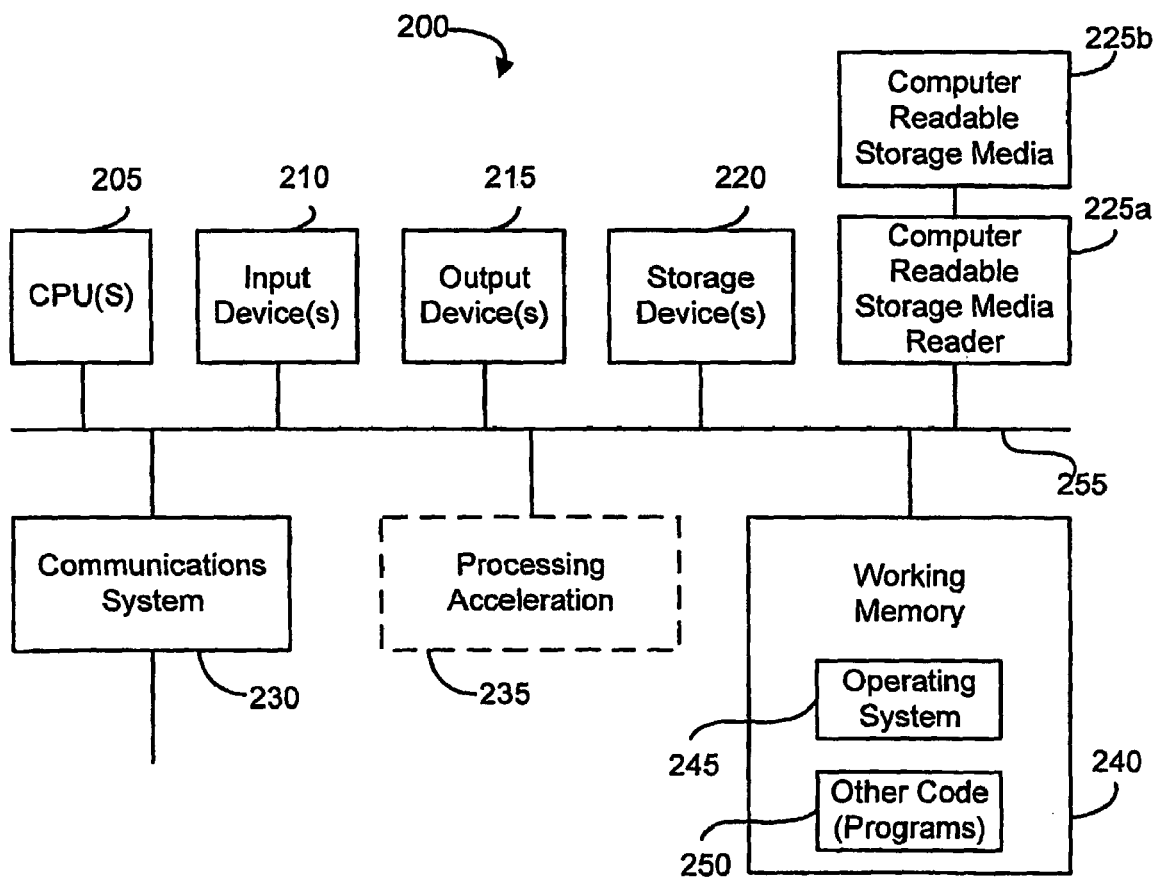
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above such as the server computers or the user computers. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). The application programs may have and/or designed to implement methods of the invention.

It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing any or all of the elements of the systems for distributing software packages as described below.

Figure 3:
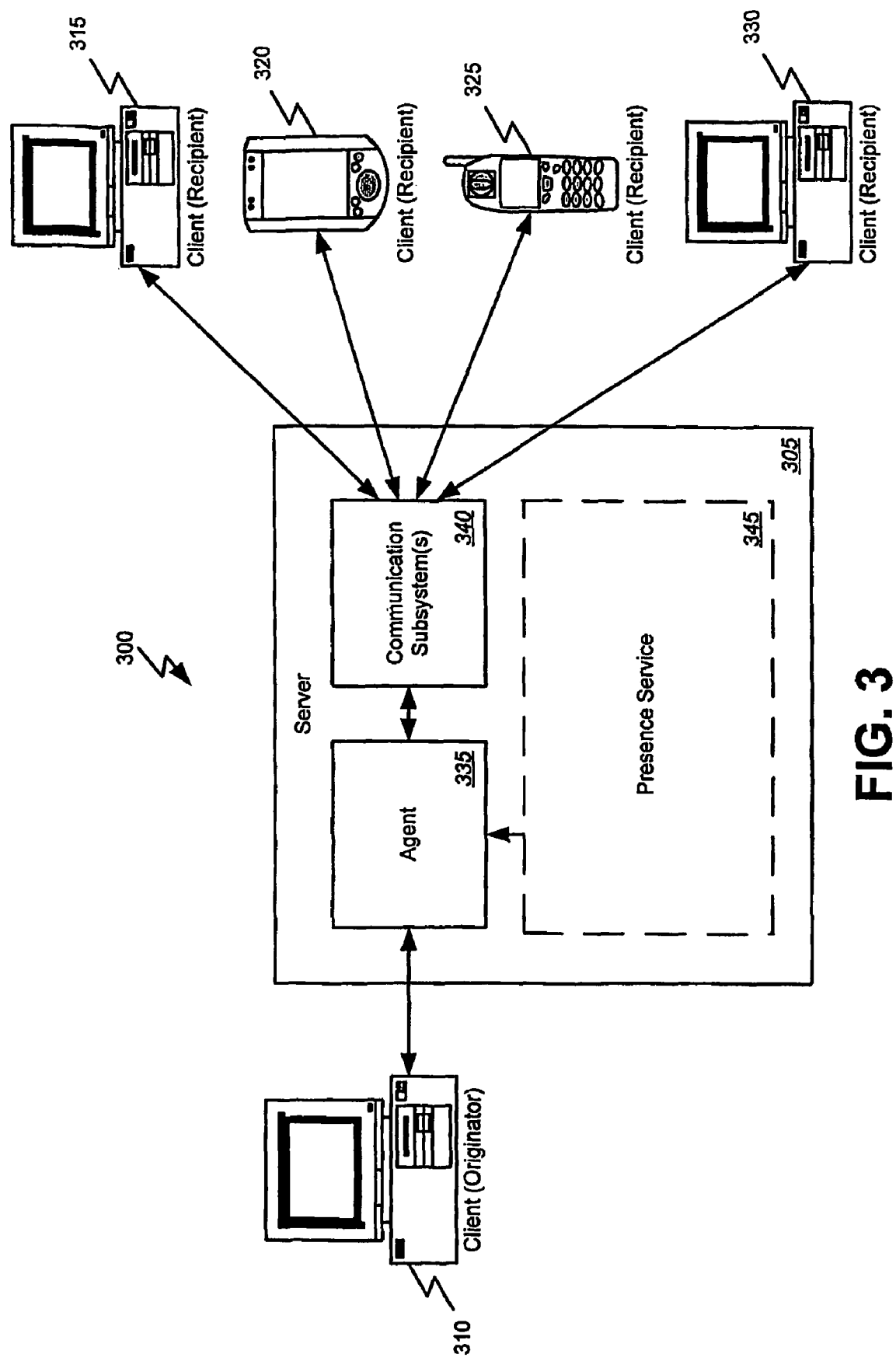
FIG. 3 is a block diagram illustrating functional components of a system for soliciting and facilitating a response to an electronic communication according to one embodiment of the present invention.

FIG. 3 is a block diagram illustrating functional components of a system for soliciting and facilitating a response to an electronic communication according to one embodiment of the present invention. In this example, the system 300 includes an originating device or sender 310, one or more recipient devices 315-330, and a server 305. The server 305 can be communicatively coupled with each of the originating device 310 and one or more recipient devices 315-330 via the Internet, an Intranet, another LAN, WAN, or other type of communication network as discussed above. While illustrated here as a personal computer, the originator 310 can be any type of device capable of communicating with the server 305. Similarly, the recipients 315-330 may be any type of device capable of communicating with the server and may in fact be many different types of devices such as personal computers, cell phones, PDAs, or any other type of wired or wireless communication devices. Generally speaking, the originator 310 can send and receive messages to and from one or more of the recipients 315-330, via the server 305. Importantly, while identified here as an originator or a recipient, it should be noted that these designations are made for illustrative purposes only and indicate only a given device's function at a specific point in time and do not indicate any type limitation on the functionality of the device. Rather, it should be understood that any given device may act as either an originator or a recipient at any given point in time.

The server can include an agent 335, such as, for example, a Mail Transfer Agent (MTA), adapted to receive from the originating device 310 a request for the electronic communication with at least one of the one or more recipient devices 315-330. That is, the user of the originating device 310 can initiate a communication by, for example, sending an email, instant message or other communication to one or more of the recipient devices 315-330. Upon receiving this communication from the originator 310, the agent 335 can determine based on the request or communication whether to solicit a response from the at least one recipient device 315-330 to which the communication is addressed. That is, based on information in or associated with the request, the agent 335 can determine whether the originator expects a response to the communication.

According to one embodiment, determining whether to solicit a response from the one or more recipients can be based on one or more keywords in the request for the electronic communication. For example, a subject line, the body, a header, or other part of the communication may include one or more keywords such as "question," "poll," "respond," "RSVP" or other words or phrases added to the request directly by the user of the originating device 310 or automatically by software of the originating device in response to the user selecting a button, link, or other user interface element of the software used to generate the request, such as an email program. Alternatively or additionally, determining whether to solicit a response from the one or more recipients can be based on a selection from the originator of the request for the electronic communication. That is, the user of the originating device 310 may select a button, link, or other user interface element of the software used to generate the request, such as an email program, which in turn sets a flag in the request message, sends a separate signal to the agent 335, or otherwise signals or triggers the agent to indicate the user wishes to receive responses to the communication.

In response to determining to solicit a response from the at least one recipient device 315-330, the agent 335 can determine one or more possible responses to the electronic communication. For example, the agent 335 may interactively query the user of the originating device 310 to select one or more predetermined responses or request other user selected and/or designated responses. Alternatively, the software of the originating device 310 used to generate the request, such as an email program, may query the user for possible responses and append these selections to the request, separately send these selections to the agent 335 or otherwise make these selections available to the agent 335.

The agent 335 can then generate at least one message that includes the one or more possible responses. That is, the agent 335 can generate an email, instant message, SMS, MMS, or other type of message that includes a list or other presentation of the possible responses. According to one embodiment, these responses can be presented in the form of selectable user interface elements such as checkboxes, buttons, etc. that may be displayed on the recipient device in the body of the message and that can selected by the user of the recipient device to indicate a response. Of course, the manner and format in which the responses are presented may vary depending upon the type message being sent and/or the type of recipient device upon which the message will be displayed as will be discussed in greater detail below. Regardless of the exact format, the at least one message can then be sent from the server 305 to the at least one recipient device 315-330, for example via communication subsystem 340 of the server 305, to initiate the communication. The agent 310 can also be adapted to receive a response from one or more of the recipient devices 315-330, the response indicating a selection of at least one of the one or more possible responses.

So, for example, a user of the originating device 310 may initiate an email or other message to one or more of the recipients 315-330. This message may include an indication, in the form of a keyword or phrase or some other indication, that a response is expected. The agent 335 can then determine one or more possible responses based on the content of the message, based on some other information in or associated with the message from the software of the originating device 310, interactively with the user of the originating device 310, or in some other manner. These possible responses can then be included in the message to be sent to the recipients in the form of one or more checkboxes, buttons, textboxes, links, etc. For example, the message may include a simple question like "Are you going to the meeting today?" The possible answers selected, indicated, or otherwise designated can include "yes" or "no" in the form of mutually exclusive checkboxes or radio buttons to be included in the message with the question. The recipient can then, upon receiving and reading the message select one of the answers to affect a response.

According to one embodiment, the agent 335 can be further adapted to maintain a record of messages sent and the recipient devices 315-330 to which the messages have been sent. The agent 310 can determine, based on the record of messages to the one or more recipient devices 315-330 and responses from the one or more recipient devices 315-330, which of the one or more recipient devices 315-330 have not responded and send a reminder to recipient devices 315-330 from which no response has been received. the agent can periodically, at a specified, time, or on the occurrence of some other event or condition, send a reminder to those recipient devices 315-330 that have not yet responded to a previously sent message.

According to another embodiment, the agent 335 can also be adapted to accumulate statistics of responses received from the one or more recipient devices 315-330 and generate an answer message that indicates the statistics of responses received from the one or more recipient devices 315-330. The agent 335 can send the answer message to the originating device 310. So, for example, the agent can tally responses received from the recipient devices 315-330 and generate a message, such as an email, to the originating device 310 indicating the results in a table, chart, graph or other format. These results may be provided to the originating device 310 upon receipt of responses from all recipient devices 315-330 or prior to receiving all response, in which case the results may also indicate how many and/or which recipient devices 315-330 have or have not responded.

As indicated above, the format of the message to any given recipient device may vary depending upon the type of device. Therefore, according to one embodiment, the agent 335 can be further adapted to determine a presence of each recipient prior to generating the at least one message that includes the one or more possible responses. So, for example, the agent 335 may determine a presence of a user or recipient indicated in the request from the originating device 310 via an optional presence service 345 that is part of or separate from the server 305. The presence service 345 can then determine a presence of the designated user on one or more devices in the conventional manner. Then, the agent 335 can generate a plurality of messages that includes one or more possible responses, each of the plurality of messages of a type readable by at least one recipient based on the presence of each recipient. Additionally or alternatively, the agent can send the message to the one or more possible recipients based on the presence of each recipient. So, for example, an email addressed to john@bigcorp.com can be delivered to his PDA, cellphone, PC or other device based on his presence on that device. Furthermore, the message with the included possible responses can be formatted by the agent as appropriate for that particular device. So, for example, if the presence service indicates John is using his cellphone, an SMS, MMS, or email message, depending upon the capabilities of that device, can be generated by the agent 335 and delivered to that device.

Figure 4:
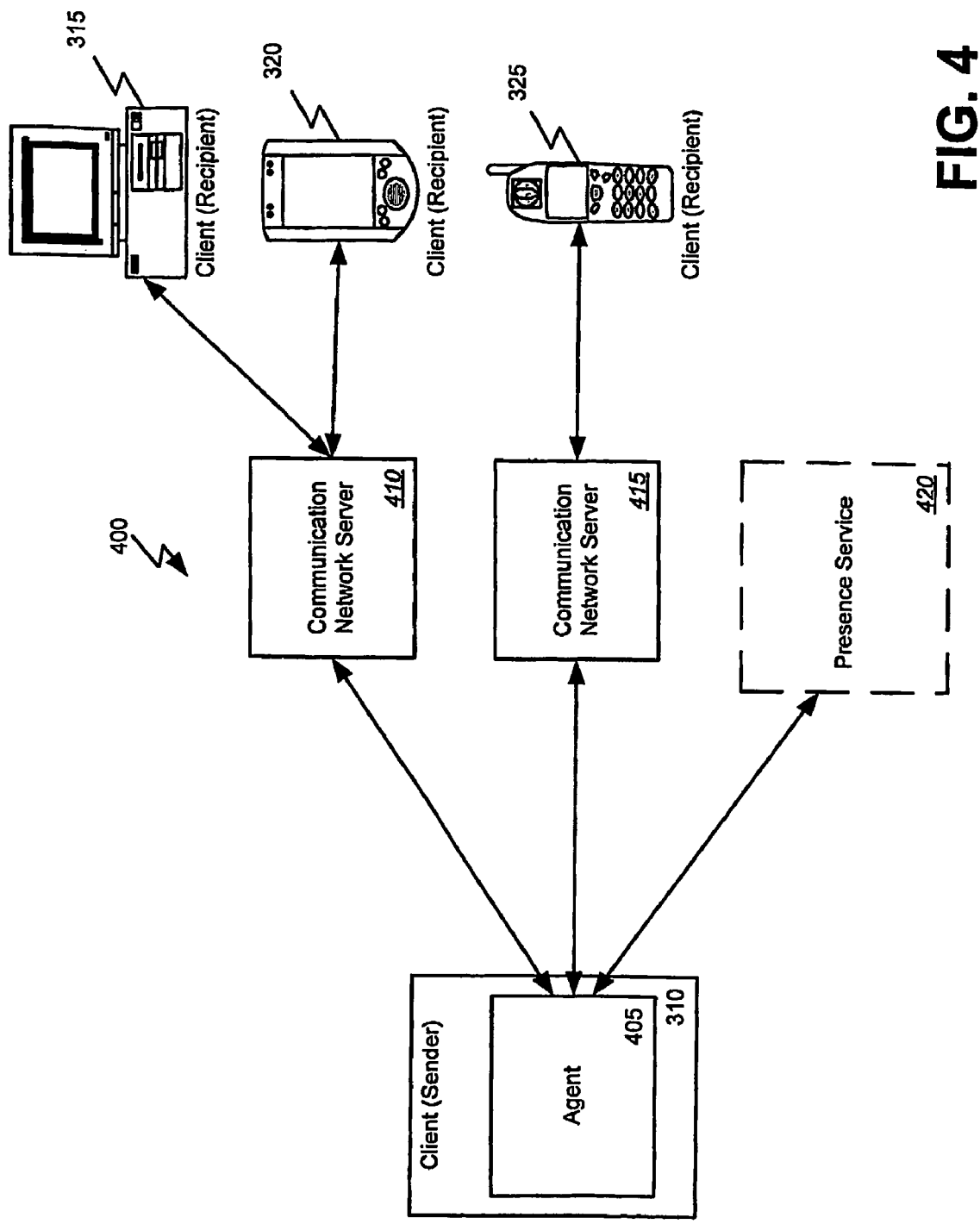
FIG. 4 is a block diagram illustrating functional components of a system for soliciting and facilitating a response to an electronic communication according to an alternative embodiment of the present invention.

FIG. 4 is a block diagram illustrating functional components of a system for soliciting and facilitating a response to an electronic communication according to an alternative embodiment of the present invention. In this example, the system 400 includes an originating device or sender 310, one or more recipient devices 315-325, and a and a number of communication network servers 410 and 415. The servers 410 and 415 can be communicatively coupled with the originating device 310 and one or more recipient devices 315-325 via the Internet, an Intranet, another LAN, WAN, or other type of communication network as discussed above. As in the previous example, while illustrated here as a personal computer, the originator 310 can be any type of device capable of communicating with the servers 410 and 415 Similarly, the recipients 315-325 may be any type of device capable of communicating with the servers 410 and 415 and may in fact be many different types of devices such as personal computers, cell phones, PDAs, or any other type of wired or wireless communication devices. Generally speaking, the originator 310 can send and receive messages to and from one or more of the recipients 315-325, via the servers 410 and 415. Importantly, while identified here as an originator or a recipient, it should be noted that these designations are made for illustrative purposes only and indicate only a given device's function at a specific point in time and do not indicate any type limitation on the functionality of the device. Rather, it should be understood that any given device may act as either an originator or a recipient at any given point in time.

In the example illustrated in FIG. 4, the originating device 310 can include an agent 405, such as, for example, a Mail User Agent (MUA), adapted to receive from the user of the originating device 310 a request for the electronic communication with at least one of the one or more recipient devices 315-325. That is, the user of the originating device 310 can initiate a communication by, for example, sending an email, instant message or other communication to one or more of the recipient devices 315-325. The agent 405 can determine based on the request or communication whether to solicit a response from the at least one recipient device 315-325 to which the communication is addressed. That is, based on information in or associated with the request, the agent 405 can determine whether the user expects a response to the communication.

According to one embodiment, determining whether to solicit a response from the one or more recipients can be based on one or more keywords in the request for the electronic communication. For example, a subject line, the body, or other part of the communication may include one or more keywords such as "question," "poll," "respond," "RSVP" or other words or phrases added to the message directly by the user of the originating device 310 or automatically by software of the originating device in response to the user selecting a button, link, or other user interface element of the software used to generate the request, such as an email program. That is, the user of the originating device 310 may select a button, link, or other user interface element of the software used to generate the request, such as an email program, which in turn sets a flag in the request message, sends a separate signal to the agent 405, or otherwise signals or triggers the agent 405 to indicate the user wishes to receive responses to the communication.

In response to determining to solicit a response from the at least one recipient device 315-325, the agent 405 can determine one or more possible responses to the electronic communication. For example, the agent 405 may interactively query the user of the originating device 310 to select one or more predetermined responses or request other user selected and/or designated responses. Alternatively, the software of the originating device 310 used to generate the request, such as an email program, may query the user for possible responses and append these selections to the request, separately send these selections to the agent 405 or otherwise make these selections available to the agent 405.

The agent 405 can then generate at least one message that includes the one or more possible responses. That is, the agent 405 can generate an email, instant message, SMS, MMS, or other type of message that includes a list or other presentation of the possible responses. According to one embodiment, these responses can be presented in the form of selectable user interface elements such as checkboxes, buttons, etc. that may be displayed on the recipient device in the body of the message and that can selected by the user of the recipient device to indicate a response. Of course, the manner and format in which the responses are presented may vary depending upon the type message being sent and/or the type of recipient device upon which the message will be displayed as will be discussed in greater detail below. Regardless of the exact format, the at least one message can then be sent from the servers 410 and 415 to the at least one recipient device 315-325 to initiate the communication. The agent 405 can also be adapted to receive a response from one or more of the recipient devices 315-325, the response indicating a selection of at least one of the one or more possible responses.

So, for example, a user of the originating device 310 may initiate an email or other message to one or more of the recipients 315-325. This message may include an indication, in the form of a keyword or phrase or some other indication, that a response is expected. The agent 405 can then determine one or more possible responses based on the content of the message, based on some other information in or associated with the message from the software of the originating device 310, interactively with the user of the originating device 310, or in some other manner. These possible responses can then be included in the message to be sent to the recipients in the form of one or more checkboxes, buttons, textboxes, links, etc. For example, the message may include a simple question like "Are you going to the meeting today?" The possible answers selected, indicated, or otherwise designated can include "yes" or "no" in the form of mutually exclusive checkboxes or radio buttons to be included in the message with the question. The recipient can then, upon receiving and reading the message select one of the answers to affect a response.

According to one embodiment, the agent 405 can be further adapted to maintain a record of messages sent and the recipient devices 315-325 to which the messages have been sent. The agent 405 can determine, based on the record of messages to the one or more recipient devices 315-325 and responses from the one or more recipient devices 315-325, which of the one or more recipient devices 315-325 have not responded and send a reminder to recipient devices 315-325 from which no response has been received. The agent can periodically, at a specified, time, or on the occurrence of some other event or condition, send a reminder to those recipient devices 315-325 that have not yet responded to a previously sent message.

According to another embodiment, the agent 405 can also be adapted to accumulate statistics of responses received from the one or more recipient devices 315-325 and generate an answer message that indicates the statistics of responses received from the one or more recipient devices 315-325. The agent 405 can present the answer message to the user of the originating device 310. So, for example, the agent 405 can tally responses received from the recipient devices 315-325 and generate a message, open a pop-up window, or otherwise present to the user of the originating device 310 the results in a table, chart, graph or other format. These results may be provided to the user of the originating device 310 upon receipt of responses from all recipient devices 315-330 or prior to receiving all response, in which case the results may also indicate how many and/or which recipient devices 315-325 have or have not responded.

As indicated above, the format of the message to any given recipient device may vary depending upon the type of device. Therefore, according to one embodiment, the agent 405 can be further adapted to determine a presence of each recipient prior to generating the at least one message that includes the one or more possible responses. So, for example, the agent 405 may determine a presence of a user or recipient indicated in the request for communication via an optional presence service 420. The presence service 420 can then determine a presence of the designated user on one or more devices in the conventional manner. Then, the agent 405 can generate a plurality of messages that includes one or more possible responses, each of the plurality of messages of a type readable by at least one recipient based on the presence of each recipient. Additionally or alternatively, the agent can send the message to the one or more possible recipients based on the presence of each recipient.

Figure 5:
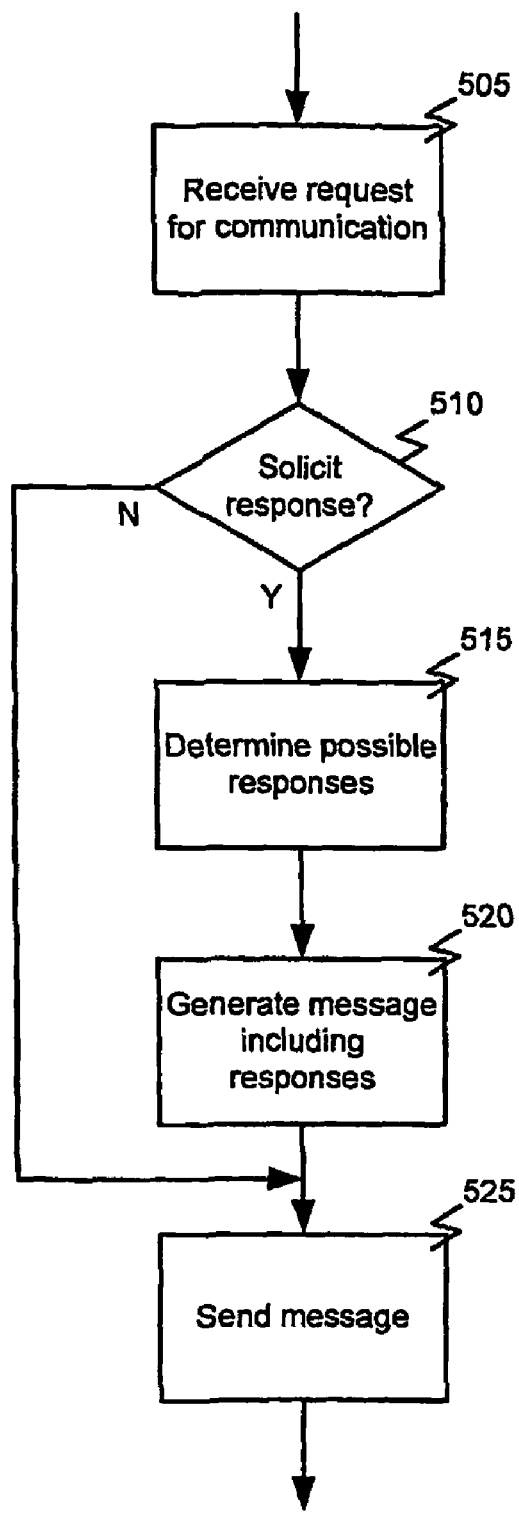
FIG. 5 is a flowchart illustrating a process of soliciting and facilitating a response to an electronic communication according to one embodiment of the present invention.

FIG. 5 is a flowchart illustrating a process of soliciting and facilitating a response to an electronic communication according to one embodiment of the present invention. In this example, the process begins with receiving 505 from an originator a request for the electronic communication with one or more recipients. Based on the request, a determination 510 can be made as to whether to solicit a response from the one or more recipients. In response to determining 510 to solicit a response from the one or more recipients, one or more possible responses to the electronic communication can be determined 515, at least one message that includes the one or more possible responses can be generated 520, and the at least one message can be sent 525 to the one or more recipients to initiate the communication.

Figure 6:
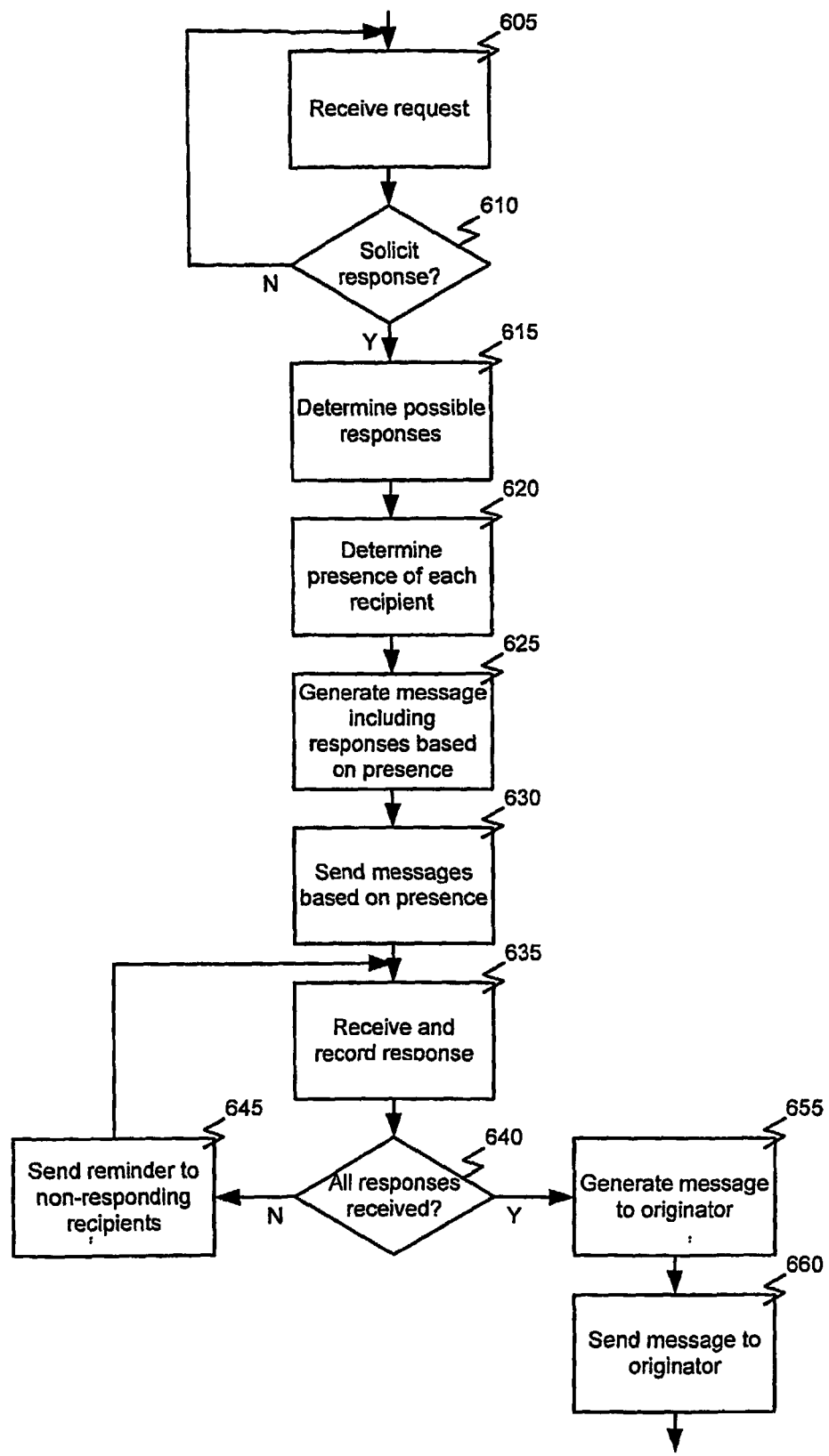
FIG. 6 is a flowchart illustrating additional details of a process of soliciting and facilitating a response to an electronic communication according to one embodiment of the present invention.

FIG. 6 is a flowchart illustrating additional details of a process of soliciting and facilitating a response to an electronic communication according to one embodiment of the present invention. In this example, processing begins with receiving 605 from an originator a request for the electronic communication with one or more recipients. Based on the request, a determination 610 can be made as to whether to solicit a response from the one or more recipients. As discussed above, determining 610 whether to solicit a response from the one or more recipients can be based on one or more keywords in the request for the electronic communication. Alternatively or additionally, determining 610 whether to solicit a response from the one or more recipients can be based on a selection from the originator of the request for the electronic communication.

In response to determining 610 to solicit a response from the one or more recipients, one or more possible responses to the electronic communication can be determined 615. Determining 615 one or more possible responses can be based on one or more selections from the originator of the request for the electronic communication. For example, the selections from the originator of the request for the electronic communication can be received in response to a plurality of predetermined possible responses presented to the originator. A presence of each recipient can be determined 620. At least one message that includes the one or more possible responses can be generated 625, and the at least one message can be sent 630 to the one or more recipients to initiate the communication based on the presence information.

A response can be received 635 from one or more of the recipients and recorded where the response can indicate a selection of at least one of the one or more possible responses. That is, statistics of responses received from the one or more recipients can be accumulated. Based on the record of messages to the one or more recipients and responses from the one or more recipients a determination 640 can be made as to whether all of the one or more recipients have not responded. If 640 not all recipients have responded, a reminder can be sent 650 to recipients from which no response has been received.

If 640 all recipients have responded, an answer message can be generated 655 that indicates the statistics of responses received from the one or more recipients. The answer message can then be sent 660 to the originator of the request for the electronic communication. Alternatively, rather than waiting for all recipients to respond, the answer message may be generated 655 and sent 660 periodically, at some designated time, upon the occurrence of some event or the satisfaction of some other event even prior to having received all responses.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of soliciting and facilitating a response to an electronic communication, the method comprising:
   receiving at a server from an originator device a request for the electronic communication with one or more recipients, the request for the electronic communication comprising an email from the originator device to each of the one or more recipients;
   determining by the server based on the request whether to solicit a response from the one or more recipients, wherein determining whether to solicit a response from the one or more recipient devices is based on one or more keywords in the request for the electronic communication;
   determining by the server a presence of each of the one or more recipients;
   in response to determining to solicit a response from the one or more recipients, determining by the server one or more possible responses to the electronic communication based on one or more selections from the originator device wherein the selections from the originator device comprise a plurality of predetermined possible responses indicated by the originator device to the server, generating by the server a plurality of messages based on the email from the originator device, each of the plurality of messages including the one or more possible responses and the plurality of messages comprising a plurality of different message types including two or more of an email message, an Interactive Voice Response (IVR) message, an Instant Message (IM), a Short Message Service (SMS) message, and a Multimedia Message Service (MMS) message, and sending the plurality of messages from the server to the one or more recipients to initiate the communication; and
   in response to determining to not solicit a response from the one or more recipients, generating by the server a plurality of messages based on the email from the originator device, the plurality of messages comprising a plurality of different message types including two or more of an email message, an Interactive Voice Response (IVR) message, an Instant Message (IM), a Short Message Service (SMS) message, and a Multimedia Message Service (MMS) message and sending the plurality of messages to the one or more recipients from the server.

2. The method of claim 1, further comprising maintaining by the server a record of messages sent and the one or more recipient devices to which the messages have been sent.

3. The method of claim 2, further comprising receiving at the server a response from one or more of the recipient devices, the response indicating a selection of at least one of the one or more possible responses.

4. The method of claim 3, further comprising:
   determining by the server based on the record of messages to the one or more recipient devices and responses from the one or more recipient devices which of the one or more recipient devices have not responded; and
   sending a reminder from the server to recipient devices from which no response has been received.

5. The method of claim 3, further comprising accumulating by the server statistics of responses received from the one or more recipient devices.

6. The method of claim 5, further comprising:
   generating by the server an answer message that indicates the statistics of responses received from the one or more recipient devices; and
   sending the answer message from the server to the originator device.

7. The method of claim 1, wherein determining whether to solicit a response from the one or more recipient devices is based on a selection from the originator device.

8. A system for soliciting and facilitating a response to an electronic communication, the system comprising:
   an originating device;
   a plurality of recipient devices; and
   a server communicatively coupled with each of the originating devices and one or more recipient devices and including an agent adapted to receive from the originating device a request for the electronic communication with at least one of the recipient devices, the request comprising an email from the originating device, determine based on the request whether to solicit a response from the at least one recipient device, wherein determining whether to solicit a response from the one or more recipient devices is based on one or more keywords in the request for the electronic communication, determine a presence of one or more recipients of the request on the plurality of recipient devices, in response to determining to solicit a response from the at least one recipient device, determine one or more possible responses to the electronic communication based on one or more selections from the originator device wherein the selections from the originator device comprise a plurality of predetermined possible responses, generate a plurality of messages based on the email from the originating device, each of the plurality of messages including the one or more possible responses and the plurality of messages comprising a plurality of different message types based on the determined presence of the one or more recipients, the message types including two or more of an email message, an Interactive Voice Response (IVR) message, an Instant Message (IM), a Short Message Service (SMS) message, and a Multimedia Message Service (MMS) message, and send the plurality of messages to the plurality of recipient devices to initiate the communication, and in response to determining to not solicit a response from the one or more recipients, generate a plurality of messages based on the email from the originating device, each of the plurality of messages comprising a plurality of different message types based on the determined presence of the one or more recipients, the message types including two or more of an email message, an Interactive Voice Response (IVR) message, an Instant Message (IM), a Short Message Service (SMS) message, and a Multimedia Message Service (MMS) message, and sending the plurality of messages to the plurality of recipient devices from the server.

9. The system of claim 8, wherein the agent is further adapted to maintain a record of messages sent and the recipient devices to which the messages have been sent.

10. The system of claim 9, wherein the agent is further adapted to receive a response from one or more of the recipient devices, the response indicating a selection of at least one of the one or more possible responses.

11. The system of claim 10, wherein the agent is further adapted to determine, based on the record of messages to the one or more recipient devices and responses from the one or more recipient devices, which of the one or more recipient devices have not responded and send a reminder to recipient devices from which no response has been received.

12. The system of claim 10, wherein the agent is further adapted to accumulate statistics of responses received from the one or more recipient devices, generate an answer message that indicates the statistics of responses received from the one or more recipient devices, and send the answer message to the originating device.

13. The system of claim 8, wherein the agent sends the message to the one or more possible recipients based on the presence of each recipient.

14. The system of claim 8, wherein the agent comprises a Mail Transfer Agent (MTA).

15. A system for soliciting and facilitating a response to an electronic communication, the system comprising:
a plurality of recipient devices; and
an originating device communicatively coupled with each of the recipient devices and including an agent adapted to receive a request for the electronic communication with at least one of the one or more recipient devices, determine based on the request whether to solicit a response from the at least one recipient device, wherein determining whether to solicit a response from the one or more recipient devices is based on one or more keywords in the request for the electronic communication, in response to determining to solicit a response from the at least one recipient device, determine one or more possible responses to the electronic communication, generate a plurality of messages, each of the plurality of messages including the one or more possible responses, each of the plurality of messages comprising a plurality of different message types based on the determined presence of the one or more recipients, the message types including two or more of an email message, an Interactive Voice Response (IVR) message, an Instant Message (IM), a Short Message Service (SMS) message, and a Multimedia Message Service (MMS) message, and send the plurality of messages to the plurality of recipient devices to initiate the communication, and in response to determining to not solicit a response from the one or more recipients, generating a plurality of messages, each of the plurality of messages comprising a plurality of different message types based on the determined presence of the one or more recipients, the message types including two or more of an email message, an Interactive Voice Response (IVR) message, an Instant Message (IM), a Short Message Service (SMS) message, and a Multimedia Message Service (MMS) message, and sending the request for the electronic communication to the one or more recipients from the server.

16. The system of claim 15, wherein the agent is further adapted to maintain a record of messages sent and the recipient devices to which the messages have been sent.

17. The system of claim 16, wherein the agent is further adapted to receive a response from one or more of the recipient devices, the response indicating a selection of at least one of the one or more possible responses.

18. The system of claim 17, wherein the agent is further adapted to determine, based on the record of messages to the one or more recipient devices and responses from the one or more recipient devices, which of the one or more recipient devices have not responded and send a reminder to recipient devices from which no response has been received.

19. The system of claim 17, wherein the agent is further adapted to accumulate statistics of responses received from the one or more recipient devices.

20. The system of claim 15, wherein the agent sends the message to the one or more possible recipients based on the presence of each recipient.

21. The system of claim 15, wherein the agent comprises a Mail User Agent (MUA).

22. The method of claim 1, wherein the keyword comprises a word in a body of the request for the electronic communication.

23. The method of claim 1, wherein the keyword comprises a word in a subject line of the request for the electronic communication.

24. The method of claim 1, wherein the keyword comprises a word in a header of the request for the electronic communication.

25. The method of claim 1, wherein the server queries the originator device and wherein the plurality of predetermined possible responses indicated by the originator device are received at the server in response to the query.

26. The method of claim 1, wherein the plurality of predetermined possible responses indicated by the originator device are received at the server as part of the request for the electronic communication from the originator device.

27. The method of claim 1, wherein the plurality of predetermined possible responses indicated by the originator device are received at the server as part of a communication separate from the request for the electronic communication from the originator device.

* * * * *

UNITED STATES PATENT AND TRADEMARK OFFICE
CERTIFICATE OF CORRECTION

PATENT NO.        : 8,161,118 B2                                        Page 1 of 1
APPLICATION NO.   : 11/577495
DATED             : April 17, 2012
INVENTOR(S)       : Maj et al.

It is certified that error appears in the above-identified patent and that said Letters Patent is hereby corrected as shown below:

In column 5, line 44, delete "may can" and insert -- may --, therefor.

In column 5, line 54, delete "(e.g." and insert -- (e.g., --, therefor.

In column 9, line 24, delete "the" and insert -- The --, therefor.

In column 10, line 9, delete "and a and a" and insert -- and a --, therefor.

Signed and Sealed this
Twenty-fourth Day of July, 2012

David J. Kappos
*Director of the United States Patent and Trademark Office*